United States Patent Office 3,252,933
Patented May 24, 1966

3,252,933
MIXTURE OF COPOLYMERS OF NITRILE-MONO-
OLEFIN AND NITRILE-DIENE
Chung Sul Youn Kim, Bellingham, Wash., and Linda M.
Wick, Warrensville Heights, Ohio, assignors to The
Standard Oil Company, Cleveland, Ohio, a corporation
of Ohio
No Drawing. Filed June 21, 1963, Ser. No. 290,283
15 Claims. (Cl. 260—29.7)

The present invention pertains to a film-forming latex composed of a blend of (A) a latex of a copolymer of an alpha,beta-olefinically unsaturated nitrile and an alpha-olefin and (B) a latex of a copolymer of an alpha,beta-olefinically unsaturated nitrile and a conjugated diene and to the films formed from said blend and to a process for preparing said blend and said films.

The latex blends of this invention are characterized in that they will form excellent films at ambient temperatures. These films have superior abrasion resistance, toughness, hardness and transparency.

The alpha,beta-olefinically unsaturated nitriles useful herein are preferably the alpha,beta-monoolefinically unsaturated nitriles having the formula

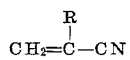

wherein R is a member selected from the group consisting of hydrogen, a lower alkyl group having from 1 to 4 carbon atoms and a halogen and most preferred are acrylonitrile and methacrylonitrile.

The alpha-olefins useful in the present invention are those having at least four and as many as ten carbon atoms having one $CH_2=C<$ grouping.

The conjugated dienes useful herein include those having from 4 to 6 carbon atoms such as butadiene-1,3, isoprene, piperylene, 2,3-dimethyl butadiene-1,3, and the like. Most preferred are butadiene-1,3 and isoprene.

The present invention embodies a method of separately preforming a copolymer latex of an alpha,beta-monoolefinically unsaturated nitrile and an alpha-olefin and a copolymer latex of acrylonitrile and a di-olefin and blending these two copolymer latices in a prescribed manner to produce a film-forming latex of superior properties and also the unique film product derived from these specified polymerization and blending procedures.

In the alpha,beta-monoolefinically unsaturated nitrile-alpha-olefin copolymer latex the polymer composition may vary from 60 to 90% by weight of the nitrile component and from 10 to 40% by weight of the alpha-olefin component.

In the alpha-beta-monoolefinically unsaturated nitrile-conjugated diolefin copolymer latex the polymer composition is preferably from 30 to 60% by weight of the nitrile component and from 40 to 70% by weight of the diolefin component.

In the blending step of the nitrile-alpha-olefin latex with the nitrile-diolefin latex, the scope of this invention encompasses blending one part by volume of the nitrile-alpha-olefin latex with from one-third part of five parts by volume of the nitrile-diolefin latex wherein the total solids of each of the latices is substantially the same. Optimum proportions of the two latices will depend in each particular case upon the specific identity of the monomeric constituents of each copolymer and the percentage composition of each of the copolymer latices to be blended.

The polymer latices of this invention are conveniently prepared in an aqueous medium in the presence of a suitable polymerization catalyst in the range of from about 15 to 60% total solids and preferably to high conversion, i.e., about 50% or higher conversion of monomers to polymer. The aqueous medium may be emulsifier-free or it may contain an emulsifier.

Suitable emulsifiers include fatty acid soaps such as sodium laurate; organic sulfates and sulfonates such as sodium lauryl sulfate, the alkali metal salts of sulfonated petroleum or paraffinic oils, the sodium salts of aromatic sulfonic acids such as the sodium salts of naphthalene sulfonic acids, the sodium salts of dodecane-1-sulfonic acid, octadecane-1-sulfonic acid, etc.; aralkyl sulfonates such as sodium isopropyl benzene sulfonate, sodium isobutyl naphthalene sulfonate, and alkali metal salts of polymerized alkyl naphthalene sulfonic acids; alkali metal and ammonium salts of sulfonated dicarboxylic acid esters and amides such as sodium dodecyl sulfosuccinate, sodium N-octadecyl sulfosuccinamate, the polyalkyl and polyalkaryl alkoxylene phosphonate acids and salts more fully described in U.S. Patent No. 2,853,471, and the like; the so-called cationic emulsifiers such as the salts of strong inorganic acids and organic bases containing long carbon chains, for instance, lauryl amine hydrochloride, the hydrochloride of diethyl aminoethyl decylamine, trimethyl cetyl ammonium bromide, dodecyl trimethyl ammonium bromide, the diethyl cyclohexylamine salt of cetyl sulfonic ester and others may be used.

In addition to the above polar or ionic emulsifiers, still other materials which may be used, singly or in combination with one or more of the above types of emulsifiers, include the so-called "nonionic" emulsifiers such as the polyether alcohols prepared by condensing ethylene or propylene oxide with higher alcohols, the fatty alkylamine condensates, the diglycol esters of lauric, oleic and stearic acids, and others. It is often desirable to add post-polymerization emulsifiers to the latices embodied herein for improved stability.

The catalyst, usually required for satisfactory polymerization rate, may be any of those commonly employed for the polymerization of acrylonitrile or acrylate esters including the various peroxygen compounds such as hydrogen peroxide, benzoyl peroxide, pelargonyl peroxide, cumene hydroperoxide, tertiary butyl hydroperoxide, tertiary butyl diperphthalate, tertiary butyl perbenzoate, sodium, potassium, and ammonium persulfate and others, such as those disclosed in U.S. Patents Nos. 2,471,959 and 2,491,471.

Particularly preferred as polymerization initiators are the water-soluble peroxygen compounds such as hydrogen peroxide, and the sodium, potassium and ammonium persulfates, the water-soluble oxidation-reduction or "redox" types of catalysts and the heavy metal activated, water-soluble peroxygen and redox catalysts. Included in this preferred list are the water-soluble persulfates; the combination of one of the water-soluble peroxygen compounds such as potassium persulfate with a reducing substance such as a polyhydroxy phenol, an oxidizable sulfur compound such as sodium bisulfite, sodium sulfite and the like; the combination of a water-soluble peroxygen compound such as potassium persulfate and dimethylaminopropionitrile; the combination of a water-soluble peroxygen compound with a reducing sugar or with a combination of a dimercapto compound and a water-soluble ferricyanide compound and others. Heavy metal ions which greatly activate potassium persulfate and the redox catalyzed polymerizations include those of silver, copper, iron, cobalt, nickel and others. The preferred range of catalyst, as above defined, is from about 0.01 to 5 parts by weight per one-hundred parts by weight of monomers.

While the polymerization may be carried out in the presence of air, the rate of reaction is ordinarily faster in the absence of oxygen and hence, polymerization in an evacuated vessel, at reflux, or under an inert atmosphere such as nitrogen or helium is preferred. The temperature at which the polymerization is carried out is not critical, it may be varied widely from −30° C. to 100° C. or higher, though best results are generally obtained at a temperature of from about 0° C. to about 70° C. Although the pH of the polymerization system is not critical, it is preferred that a pH of about 7–8 be employed during the polymerization reaction. The final polymer latex may be adjusted to any desired pH. The polymerization may be a batch polymerization or one or more of the components, i.e., monomers, catalysts, activator, emulsifier, water, etc., may be added incrementally or continuously during the polymerization reaction.

Still other substances which desirably may be incorporated into the reaction medium include buffers, electrolyte salts (see "Synthetic Rubber," G. S. Whitby, John Wiley & Sons, Inc., New York, 1954, pp. 226 and 227), carbon black and other pigments and fillers in a manner well understood in the art.

In carrying out the process of this invention, the nitrile and alpha-olefin monomers are mixed in the desired proportions with water, emulsifier, polymerization initiator, and molecular weight modifiers in a container through which a stream of nitrogen gas is bubbled. The container is then sealed and gently agitated at a temperature of about 60° C. for a period of about 18 hours.

Similarly, the nitrile and the diolefin monomers are mixed in the desired proportions with water, emulsifier, polymerization initiator, and molecular weight modifier in a container through which a stream of nitrogen gas is bubbled to remove air from the reaction vessel. The container is then sealed and gently agitated at a temperature of about 60° C. for a period of about 18 hours. In the case of the preparation of each of the latices the 18-hour reaction time was chosen arbitrarily as an experimental expedient to ensure complete polymerization of the monomers. Experiments have shown that this time is not a restrictive minimum but can be considerably reduced in the interest of economy of manufacture.

The two latices prepared in the foregoing manner are then blended in the desired proportions to form a high solids, film-forming latex capable of depositing films having superior characteristics such as oil and water resistance, transparency, clarity, hardness and anti-blocking tendencies.

The products and processes of this invention are further illustrated in the following examples wherein the amounts of the various ingredients are expressed as parts by weight unless otherwise specified.

EXAMPLE I (A) An acrylonitrile-2-methyl pentene-1 copolymer latex was prepared by charging a mixture of 25 parts of acrylonitrile, 25 parts of 2-methyl pentene-1, 0.19 part of tertiary dodecyl mercaptan, 0.14 part of potassium persulfate, 1.18 parts of Gafac RE–610,[1] 0.05 part of Daxad 11,[2] and 100 parts of water in a reaction vessel into which a stream of nitrogen gas was bubbling in order to remove air. The reaction vessel was then sealed with a foil-lined stopper and placed in a tumbling wheel which was immersed in a constant temperature bath, the temperature of which was controlled at 60° C. The polymerization mixture was agitated by tumbling at the reaction temperature for a period of 18 hours at which time the polymerization reaction was essentially completed.

(B) A reactor was charged with 22.0 parts of acrylonitrile, 28 parts of isoprene, 0.21 part of normal dodecyl mercaptan, 0.12 part of potassium persulfate, 0.05 part of Daxad 11, 2.2 parts of Gafac RE–610, and 200 parts of water while a stream of nitrogen was gas bubbled through the vessel to eliminate most of the air. The vessel was sealed and the polymerization was carried out at 60° C. for 18 hours in the manner described in (A) above.

Latices (A) and (B) were blended in a ratio of one volume of (A) to one volume of (B) to produce a film-forming latex which deposited at room temperature, a tough, transparent, resistant film.

In another embodiment of the method of the invention, an acrylonitrile and 2-methyl pentene-1 copolymer latex was prepared as described above and this latex was blended with a commercially available acrylonitrile-butadiene-1,3 copolymer latex, Chemigum 235–CHS, sold by the Goodyear Tire and Rubber Company of Akron, Ohio, which was composed of 45% by weight of acrylonitrile and 55% by weight of butadiene-1,3. These copolymer latices were blended in a ratio of three volumes of the acrylonitrile-2-methyl pentene-1 copolymer latex to two volumes of the Chemigum 235–CHS latex to produce a film-forming latex which deposited, at room temperature, a tough, transparent film.

Other embodiments of the invention wherein polymerization procedures similar to those described above were used are listed in the following table.

The minimum film-forming temperatures were determined by using a 15 inch long Parr bar constructed of brass having a heating means at one end and a cooling means at the other. The latex sample was cast upon the bar and temperature at the various points along the bar was continuously determined by means of thermocouples. The temperature (minimum) at which an integral film formed was recorded as the minimum film-forming or minimum filming temperature (M.F.T.). For more details regarding minimum filming temperature testing see "Journal of Applied Polymer Science," vol. 4, pp. 81–85 (1960).

In the table AN means acrylonitrile, IB means isobutylene, BD means butadiene, IP means isoprene, PENT means n-pentene-1, MB means 2-methyl butene-1, HEX means n-hexene-1, MP means 2-methyl pentene-1 and DIB means a diisobutylene mixture containing 71.5% by weight of alpha-diisobutylene.

---

[1] A mixture of $RO—(CH_2CH_2O—)_nPO_3M_2$ and
$[R—O(CH_2CH_2O)_n]_2PO_2M$ wherein $n$ is a number of from 1 to 40, R is an alkyl or alkaryl group and preferably a nonyl phenyl group and M is hydrogen ammonia or an alkali metal, which composition is sold by the General Aniline and Film Corp.

[2] A sodium salt of a polymerized alkyl naphthalene sulfonic acid sold by the Dewey and Almy Chemical Co.

Table

| Weight Percent Monomer in Latex Resin (A) | | Weight Percent Monomer in Latex Resin (B) | | Weight Percent Monomer in Resins in Blend | | | M.F.T. |
|---|---|---|---|---|---|---|---|
| AN | Olefin | AN | Diolefin | AN | Olefin | Diolefin | |
| 74 | 26 IB | 45 | 55 BD | 56 | 10 | 34 | <Rm. Temp. |
|    |       |    |       | 61 | 14 | 25 | <Rm. Temp. |
| 74 | 26 IB | 41 | 59 IP | 56 | 12 | 32 | <Rm. Temp. |
|    |       |    |       | 59 | 14 | 27 | <Rm. Temp. |
|    |       |    |       | 62 | 16 | 22 | <Rm. Temp. |
| 84 | 16 PENT | 45 | 55 BD | 62 | 7 | 31 | <Rm. Temp. |
| 72 | 28 MB | 45 | 55 BD | 57 | 12 | 31 | <Rm. Temp. |
| 84 | 16 HEX | 45 | 55 BD | 62 | 7 | 31 | <Rm. Temp. |
| 75 | 25 MP | 45 | 55 BD | 55 | 8 | 37 | <Rm. Temp. |
|    |       |    |       | 60 | 12 | 28 | <Rm. Temp. |
| 75 | 25 MP | 41 | 59 IP | 54 | 10 | 36 | <Rm. Temp. |
|    |       |    |       | 58 | 12 | 30 | <Rm. Temp. |
|    |       |    |       | 60 | 14 | 26 | <Rm. Temp. |
| 77 | 23 MP | 45 | 55 BD | 56 | 8 | 36 | <Rm. Temp. |
|    |       |    |       | 60 | 10 | 30 | <Rm. Temp. |
|    |       |    |       | 62 | 12 | 26 | <Rm. Temp. |
| 78 | 22 DIB | 45 | 55 BD | 60 | 10 | 30 | <Rm. Temp. |
| 70 | 30 DIB | 45 | 55 BD | 51 | 8 | 41 | <Rm. Temp. |
|    |       |    |       | 53 | 10 | 37 | <Rm. Temp. |
|    |       |    |       | 55 | 12 | 33 | <Rm. Temp. |
| 78 | 22 DIB | 45 | 55 BD | 58 | 9 | 33 | <Rm. Temp. |
|    |       |    |       | 61 | 11 | 28 | <Rm. Temp. |

EXAMPLE II

A latex prepared according to the procedure of Example I (A) from a charge of 50% by weight of acrylonitrile, and 50% by weight of isobutylene wherein the analysis of the polymer showed an acrylonitrile content of 74% by weight and isobutylene content of 26% by weight, was blended with a latex prepared according to the procedure of Example I(B) from a monomer charge and polymer composition of 45% by weight of acrylonitrile and 55% by weight of butadiene wherein the blend of solids contained as determined by analysis an acrylonitrile content of 56% by weight, isobutylene content of 10% by weight and butadiene content of 34% by weight. A film from the blend was found to have a minimum filming temperature below room temperature, a Sward hardness of more than 8 and it passed the oil resistance test. The Sward hardness was determined with the Sward hardness rocker and the oil resistance test was carried out by casting a 5 mil film of the polymer onto a flat glass sheet, allowing the film to dry overnight, placing a drop of dyed Wesson oil (vegetable oil) on the film and allowing it to stand for an hour and then rubbing the oil into the film. The film passed the test when no dye transferred to the film and the film did not disintegrate during the rubbing.

EXAMPLE III

The procedure of Example II was repeated using an (A) latex of a monomer charge of 50% by weight of acrylonitrile and 50% by weight of isobutylene wherein the polymer contained 74% by weight of the acrylonitrile and 26% by weight of isobutylene and a (B) latex of a copolymer of 41% by weight of acrylonitrile and 59% by weight of isoprene. The solid polymer in the blend contained by analysis 56% by weight of acrylonitrile, 12% by weight of isobutylene and 32% by weight of isoprene. The blend latex had a minimum filming temperature of below room temperature, a Sward hardness of 10 and the film passed the oil resistance test. A film from a commercial copolymer latex of 45% by weight acrylonitrile and 55% by weight of butadiene had a Sward hardness of from 0–2 and was extremely tacky.

Similarly a blend of latex (A) and (B) from above wherein the solid polymer in the blend was found to contain 62% by weight of acrylonitrile, 16% by weight of isobutylene and 22% by weight of isoprene formed films at a temperature well below room temperature, the films resulting therefrom having a Sward hardness of 22 and excellent oil resistance.

EXAMPLE IV

The procedure of Example II was repeated using a blend of an (A) latex of a monomer charge of 50% by weight of acrylonitrile and 50% by weight of 2-methyl pentene-1 wherein the latex contained a polymer having 75% by weight of acrylonitrile and 25% by weight of 2-methyl pentene-1, and a (B) latex of a polymer containing 45% by weight of acrylonitrile and 55% by weight of butadiene. The polymer in the blend was found by analysis to contain 55% by weight of acrylonitrile, 8% by weight of 2-methyl pentene-1 and 37% by weight of butadiene. The blend latex had a minimum filming temperature of less than room temperature, the films therefrom having a Sward hardness of greater than 8 and excellent oil resistance.

EXAMPLE V

The procedure of Example II was repeated using a blend of an (A) latex of a monomer charge of 50% by weight of acrylonitrile and 50% by weight of 2-methyl pentene-1 wherein the polymer contained 75% by weight of acrylonitrile and 25% by weight of 2-methyl pentene-1, and a (B) latex of a copolymer of 41% by weight of acrylonitrile and 59% by weight of isoprene. The polymer in the blend was found by analysis to contain 60% by weight of acrylonitrile, 14% by weight of 2-methyl pentene-1 and 26% by weight of isoprene. The blend latex had a minimum filming temperature of less than room temperature, the films therefrom having a Sward hardness greater than 8 and excellent oil resistance.

EXAMPLE VI

The procedure of Example II was repeated using a blend of an (A) latex of a monomer charge of 50% by weight of acrylonitrile and 50% by weight of diisobutylene wherein 52% conversion of a polymer containing 78% by weight of acrylonitrile and 22% by weight of diisobutylene was obtained, and a (B) latex of a copolymer of 45% by weight of acrylonitrile and 55% by weight of butadiene. The polymer in the blend was found by analysis to contain 60% by weight of acrylonitrile, 10% by weight of diisobutylene and 30% by weight of butadiene. The blend latex had a minimum filming temperature of below room temperature and the films therefrom had a Sward hardness of 10 and excellent oil resistance.

EXAMPLE VII

The procedure of Example II was repeated using a blend of an (A) latex of a monomer charge of 50% by weight of acrylonitrile and 50% by weight of pentene-1 wherein the copolymer was found to contain 84% by weight of acrylonitrile and 16% by weight of pentene-1, and a (B) latex of a copolymre of 45% by weight of acrylonitrile and 55% by weight of butadiene. The polymer in the blend was found by analysis to contain 62% by weight of acrylonitrile, 7% by weight of pentene-1 and 31% by weight of butadiene. The blend latex had a minimum filming temperature of below room temperature and films therefrom had a Sward hardness of 8 and excellent oil resistance.

We claim:
1. The film-forming composition comprising a blend of
 (A) a latex of a resinous copolymer of (1) a nitrile having the structure

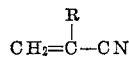

wherein R is a member selected from the group consisting of hydrogen, a lower alkyl group having from 1 to 4 carbon atoms and a halogen and (2) an alpha-beta monoolefin having one grouping $CH_2=C<$ and containing from 4 to 10 carbon atoms, and
 (B) a latex of a resinous copolymer of (1) a nitrile having the structure

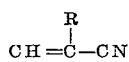

wherein R is a member selected from the group consisting of hydrogen, a lower alkyl group having from 1 to 4 carbon atoms and a halogen and (2) a conjugated diene having from 4 to 6 carbon atoms.

2. The composition of claim 1 wherein the nitrile component of (A)(1) is present in from 60 to 90% by weight of the copolymer and the alpha-olefin component of (A)(2) is present in from 10 to 40% by weight of the copoloymer.

3. The composition of claim 2 wherein the nitrile component of (B)(1) is present in from 30 to 60% by weight of the copolymer and the conjugated diene component of (B)(2) is present in from 40 to 70% by weight of the copolymer.

4. The composition of claim 3 wherein the resinous copolymer solids of latex (A) and latex (B) are substantially equal and there is present for each part by volume of latex (A) from ⅓ to 5 parts by volume of latex (B).

5. The composition of claim 4 wherein the nitrile component of (A)(1) and (B)(1) is acrylonitrile.

6. The composition of claim 5 wherein the alpha-olefin is isobutylene and the conjugated diene is butadiene.

7. The composition of claim 5 wherein the alpha-olefin is isobutylene and the conjugated diene is isoprene.

8. The composition of claim 5 wherein the alpha-olefin is n-pentene-1 and the conjugated diene is butadiene.

9. The composition of claim 5 wherein the alpha-olefin is 2-methyl butene-1 and the conjugated diene is butadiene.

10. The composition of claim 5 wherein the alpha-olefin is diisobutylene and the conjugated diene is butadiene.

11. The composition of claim 5 wherein the alpha-olefin is n-hexene-1 and the conjugated diene is butadiene.

12. The composition of claim 5 wherein the alpha-olefin is 2-methyl pentene-1 and the conjugated diene is isoprene.

13. The composition of claim 5 wherein the alpha-olefin is 2-methyl pentene-1 and the conjugated diene is butadiene.

14. The film resulting from the deposition on a surface and evaporation of the volatile matter from the composition of claim 1.

15. The method for preparing a film comprising coating on a surface the composition of claim 1 and removing the volatile matter from said coating.

References Cited by the Examiner
UNITED STATES PATENTS

| | | | |
|---|---|---|---|
| 2,731,060 | 1/1956 | Rowe | 260—889 |
| 2,821,514 | 1/1958 | Sarbach et al. | 260—29.7 |

MURRAY TILLMAN, *Primary Examiner.*